Dec. 7, 1965   W. A. NICHOLS ETAL   3,221,583
SAW FEEDING DEVICE
Filed Sept. 13, 1963   2 Sheets-Sheet 1
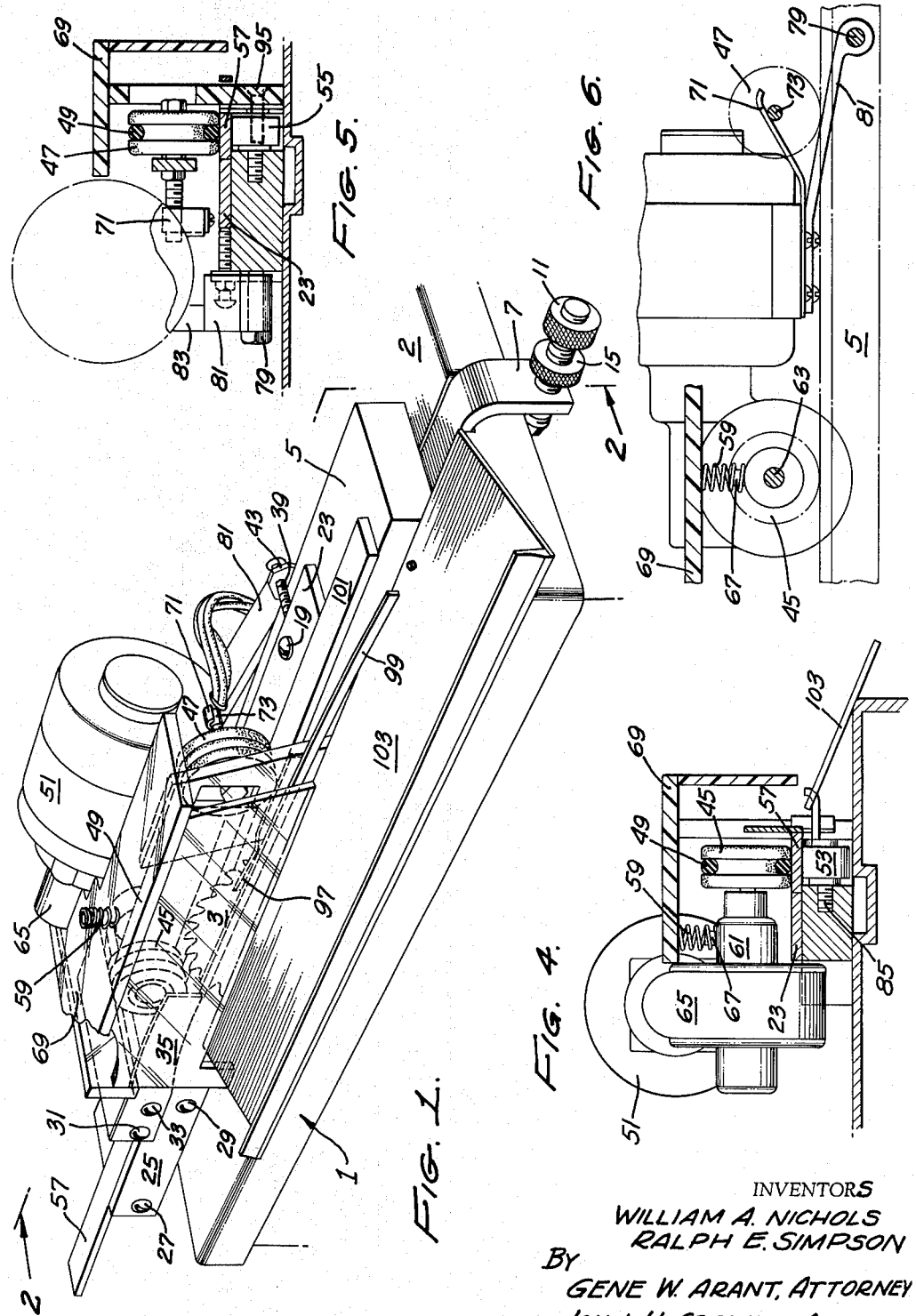
INVENTORS
WILLIAM A. NICHOLS
RALPH E. SIMPSON
BY
GENE W. ARANT, ATTORNEY
JOHN H. CROWE, AGENT

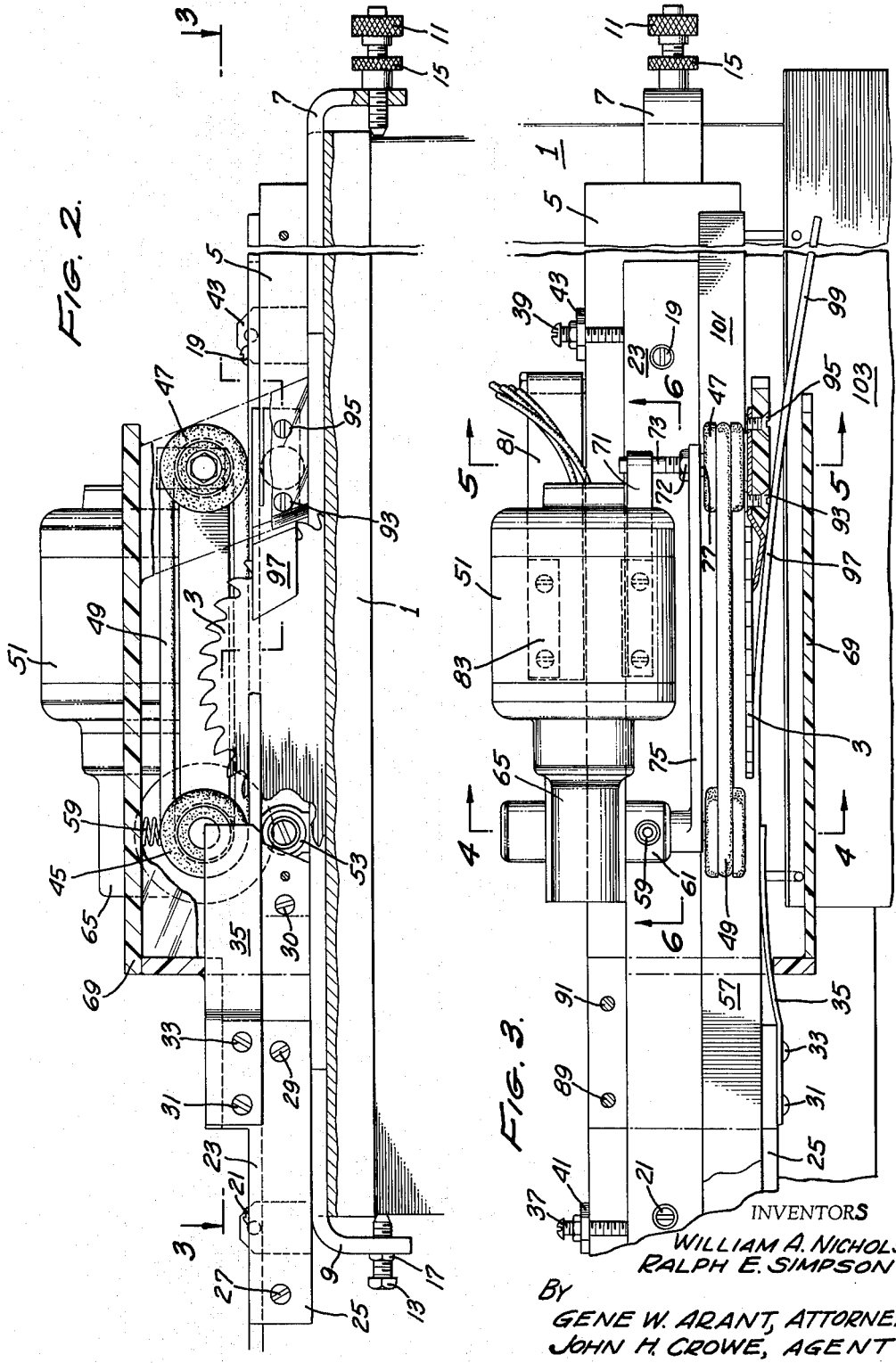

United States Patent Office 3,221,583
Patented Dec. 7, 1965

3,221,583
SAW FEEDING DEVICE
William A. Nichols, 5617 Hawthorne, and Ralph E. Simpson, 9815 Monte Vista Ave., both of Montclair, Calif.
Filed Sept. 13, 1963, Ser. No. 308,913
6 Claims. (Cl. 83—163)

This invention relates to an apparatus for continuously delivering work stock to a saw in such fashion as to permit the saw blade to remove a thin facing from the body of the stock with great precision and accuracy. More particularly, the invention relates to such an apparatus adapted for feeding an elongated slug of type metal to an operating saw blade in such fashion as to effectuate the stripping of a face from the body of the slug and thereby provide a strip useful as a border in newspaper advertising make-up where the hot metal paste-up system of composition is employed.

The so-called hot metal paste-up method of setting up display ads is supplanting the conventional method of ad make up in the composing rooms of an increasingly large number of newspapers. There are various alternative ways of carrying out hot metal paste-up but basically the process consists of stripping the faces from type slugs which have been previously collated and spaced out according to the ad layout and then pasting the stripped faces of the type copy, along with cuts, onto an adhesive-coated mounting or base material according to the desired arrangement. As printers, and others familiar with composing room techniques, are aware, there are many parts to an ad, all of which must be either shaved or cut to the same thickness, or particular ones adjusted where necessary with shims or the like so that all are ultimately of the same thickness. Many newspapers are now using hot metal paste-up and are stripping all display type and shaving all stero flat casts to zinc thickness (.065") so that stripped type, borders, price boxes, rules, and other parts of the ad do not have a tendency to tip or roll over during mat molding, as is the case with shell-high (.152") material. The significance of these thicknesses, and the terms of art used herein, are known to compositors and others familiar with composing room work and will not be discussed in detail here.

The base material upon which the type, cuts, and other parts of an ad are pasted is a cut-to-ad-size piece of .087" thick Plexiglas or high (.853") Plexiglas Rezlon plastic or metal base with a double coated tape (such as Scotch Y-9113 or #465 tape), depending upon the particular system of hot metal paste-up used. Where the thinner Plexiglas is employed, the overall thickness of an ad make-up is .152"-.153" and regular low base (.765") can be used for proofing and in the page lock-up. Where the high Plexiglas, Rezlon plastic or metal base is employed no additional base material is required for proofing and page lock-up. Still another method of hot metal paste-up employs a cut-to-ad-size piece of single sided translucent or transparent tape in place of the Plexiglas or other above-noted base material, in which case the overall thickness of an ad make-up is approximately .067". Here regular high base (.853") is used for proofing and in the page lock-up.

It will be apparent that in hot metal paste-up there is a constant necessity for the trimming or stripping of blocks of copy (which are typically held together for the purpose by a piece of transparent tape pressed firmly onto their faces and cut to copy block size), border slugs, etc. At the present time much of this work is accomplished by means of a Morrison slug stripper, a machine manufactured by the Morrison Company of Milwaukee, Wisconsin. The machine, hereinafter referred to simply as a slug stripper, consists basically of a hard steel saw blade (formed cutter) and a sliding work table, similar to a composing room saw-trimmer. A slug stripper cuts the letter characters from line-composing and Ludlow slugs, as well as from monotype and foundry cast type, and strip-cast rules and borders. Because of the sliding work table arrangement for feeding the slugs to the saw, there is a limitation as to the length of work stock that can be cut by a single pass.

Display ads frequently require borders, angled lines, etc., of such length as to exceed the capacity of a slug stripper, in which case it is impossible to cut the full length of border strip, line, or the like, in a single pass on that machine. This obviously adds to the burden of making the border strips and constitutes a drawback to the use of the hot metal paste-up system, which is otherwise superior in many ways to conventional ad composition techniques. The only metal carpentry tool capable of cutting strips from slugs for ad make-up purposes other than the slug stripper, insofar as we are aware, is the Rouse hot metal paste-up saw, a band saw with feed mechanism inherently limited to a maximum lineal delivery of work stock per pass of fifteen inches. Thus, this saw is subject to the same sort of feed limitation (inability to cut long border strips or the like with a single pass or work stroke of the feed mechanism) as is the slug stripper.

The border stripper of this invention was designed and intended primarily as a tool of superior accuracy capable of continuously feeding slugs of any length to a saw blade whereby border strips of equivalent length can be cut therefrom in one simple, effortless operation. Thus, the border stripper satisfies a real need in newspaper composing rooms, particularly those employing the hot metal paste-up system, and one not heretofore satisfied by any available means to our knowledge.

It is thus a principal object of this invention to provide an apparatus for continuously feeding work stock to a stripping saw whereby a face of accurately uniform thickness can be stripped from a body of such stock of any length.

It is another object of the invention to provide such an apparatus particularly suitable for stripping a face from the body of a type metal slug of any length to yield a strip of uniformly accurate thickness especially useful as a line or border for newspaper display ad make up purposes.

Other objects, features and advantages of our invention will be readily apparent from the complete description thereof to follow.

Briefly, the apparatus of this invention consists of a guide fence and means for simultaneously holding one edge of a body of work stock to be stripped firmly against the fence in such a way as to prevent tipping or twisting thereof and, at the same time, feeding said work stock through a cooperating power saw at a uniform rate of travel. The apparatus, in its preferred form, has self-contained means of attachment to a table saw whereby the work stock can be fed to the saw blade in the described manner to fulfill the purposes of the invention. The invention will be better understood by reference to the accompanying drawings, of which:

FIGURE 1 is a perspective view of a preferred embodiment of apparatus in accordance with this invention, mounted and functioning in operational position on the top of a circular blade table saw cabinet, showing a body of work stock being stripped as it is fed past the saw blade;

FIGURE 2 is a longitudinal sectional view of the mounted apparatus and cabinet top and blade of the table saw, taken on lines 2—2 of FIGURE 1;

FIGURE 3 is a stepped, partially sectional view, showing in plan detail the means for handling the edge of the work stock being stripped by the saw blade before and after the point of contact of said stock with said blade, taken along line 3—3 of FIGURE 2;

FIGURE 4 is a transverse view of the assembly, taken mostly in section along the line 4—4 of FIGURE 3;

FIGURE 5 is another transverse view of the assembly, taken mostly in section along line 5—5 of FIGURE 3; and FIGURE 6 is a fragmentary, sectional view of the FIGURE 1 apparatus showing the means for holding the work stock in place during functioning of the pictured assembly, taken along line 6—6 of FIGURE 3 but showing certain structural details in phantom outline to reveal other details otherwise hidden thereby.

Turning now to a detailed consideration of the drawings, there is shown part of the upper portion of a conventional table saw 1, having a circular saw blade 3 and a channeled cabinet or table top 2 of the type commonly seen on sliding work table saws, such as composing room saw trimmers, having a bar member 5 of rectangular cross-section mounted thereon. Bar member 5 serves as a support base for the elements of the apparatus of this invention and it is secured to table top 2 in such position that one of its edges is disposed parallel to the plane of saw blade 3 and in close proximity thereto, as shown on the drawings. Bar 5 is firmly but removably secured in place with most of its bottom face flush against the elevated portion of the surface of table top 2 by means of two metal straps 7 and 9 which are flatly attached, in longitudinal alignment, for less than their full lengths, by welding or other suitable means, to said bottom face and which are so transversely sized as to fit comfortably, but not bindingly, into a guide channel in the table top. The mating interfit between the guide channel and appropriate portions of straps 7 and 9 is demonstrated particularly well in FIGURES 1 and 2.

Straps 7 and 9 extend outwardly from the ends of bar member 5 and each is bent downwardly through an angle of 90° beyond the point of extension to permit them to straddle table top 2 in the manner shown in the drawings. Two set screws, 11 and 13, pass through receptive openings in the downwardly depending ends of straps 7 and 9 respectively, and lock against the lower corner edge of the top of the table saw cabinet (the term "cabinet" as used herein in its present or equivalent context is intended to mean the entire housing structure for the table saw, including the top of the structure which is sometimes here referred to as a cabinet top and sometimes as a table top to hold the thus-joined parts together). Contact between the set screws and the lower corner edge of the table top is made possible by tapered ends on the screws and cooperating holes in straps 7 and 9 so located as to guide the thus-tapered end portions of the screw shanks into meeting adjacency with said edge. This type of screw engagement is superior to the conventional perpendicular thrust type of engagement in that it combines a downward pull component with an inward thrust component and provides increased insurance against vertical displacement of bar member 5 and its load of component parts remaining to be described. The locking action of set screw 11 is augmented by a knurled head lock nut 15, and that of set screw 13 by a lock nut 17, as shown on the drawings.

Rigidly secured to the upper surface of bar member 5 by machine screw and washer means, as shown at 19 and 21, is a flat, relatively thin metal bar 23, hereinafter referred to as fence 23. One end of fence 23, the left as seen on the drawings, is flush with the corresponding end of bar member 5 but its other end terminates short of the other end of bar member 5. As will later be seen, the edge of fence 23 nearest saw blade 3 serves as a lateral guide for work stock being fed thereto and the top of bar member 5 between fence 23 and its edge nearest saw blade 3 serves as a glide pathway for the work stock as it travels into and past the saw blade. Consequently, these two surfaces (the guide edge of fence 23 and the indicated portion of the upper surface of bar member 5) are machined to substantially friction free smoothness to permit travel of the work stock through the sawing operation. Furthermore, for obvious reasons, fence 23 and bar member 5 are, for best results, carefully fabricated and assembled to precise size and quality specifications. For example, since the edge of fence 23 serves as a guide for the work stock, the fence should, for optimum effect, be carefully positioned and aligned with respect to saw blade 3 so that a uniformly defined passageway for said stock capable of guiding it without wobble or deviation is thereby assured.

Fixedly secured to the side of bar member 5 nearest saw blade 3 with one of its ends flush with the feed end of bar member 5 is an L-shaped metal plate 25. The two legs of the L formed by plate 25 are of differing lengths, the longer of the two being disposed longitudinally parallel to bar member 5 and the shorter projecting upwardly, for reasons later made apparent, from the innerly disposed (as opposed to the feed) end of the longer leg. Plate 25 is fastened to bar member 5 positionally as described by means of two machine screws 27 and 29. The plate is not fastened flush against bar member 5 but is separated therefrom by a shim appropriately apertured to permit the passage of screws 27 and 29. The shim is so sized, configured and positioned as to bring its upper edge, when installed, to substantially the same level as the top of bar member 5, and it is longer than the horizontally disposed leg of plate 25, extending along the side of bar member 5 to a terminus near the position of drive roller 45, as shown on FIGURE 2. In addition to being held by machine screws 27 and 29, which pass through plate 25 as well as the shim, the latter is further held by a third screw 30 situated near its forward end. The apparatus could be constructed without a shim of the type illustrated and described if desired by merely molding bar member 5 in such a way as to obviate the necessity of employing such a part.

The longer leg of plate 25 extends to the same height above the upper face of bar 25 as does fence 23. Thus, a feed channel for work stock enroute to trimming treatment by saw blade 3 is formed by fence 23, the upper portion of the longer leg of plate 25, the portion of the top face of bar member 5 disposed between said fence and said upper portion of the longer leg of plate 25, and the upper edge of the aforesaid shim, the latter two surface areas forming the bottom of the channel. The width of the channel is adjustable to accommodate differing feed stock size demands by virtue of transversely (with respect to bar member 5) slotted openings for the 19 and 21 machine screws, to permit lateral adjustment of the location of fence 23, through bar member 5. The slotted openings are not visible on the drawings, being hidden by the washers for the 19 and 21 screws, and, as will thus be evident, are not of sufficient size to permit much leeway of lateral fence movement. However, for the normally contemplated uses of our invention the lateral adjustment demands are not great and readily accommodated by the slotted opening expedient described. For example, a typical demand of the sort to be expected in the above-discussed type metal slug stripping operations, as will later be evident, is an adjustment to compensate for the difference between lineal measurements of 0.065 and 0.152 inch, or 0.087 inch.

Other means of making lateral fence adjustments, such as, for example, the use of a shim between the fence and work stock, can be employed within the scope of our invention. Shims typically suitable for this purpose can be of angular cross-section such as those presently used on known metal carpentry appliances. The method of using angular shims of this sort is simple, the shim merely being fitted over the appropriate corner edge of the fence with one web adjacent the top and the other adjacent the side of the fence forming one of the feed channel side walls. The shim can be pinned to the fence at each end to prevent relative slippage therebetween during use of the apparatus. In addition to being anchored by machine screw means 19 and 21, fence 23 is further secured against the possibility of lateral movement by two set screws 37 and 39, with accompanying lock nuts, which bear against the edge of the fence facing away from saw blade 3 and lock against two upright brackets, 41 and 43, respectively, which are fastened securely to the side of bar member 5 facing away from the saw blade, all as shown in the drawings.

Firmly secured to the upwardly projecting leg of plate 25 by means of two relatively short machine screws 31 and 33 is an elongated strip of relatively thin spring metal 35, said strip extending longitudinally of the channel-like path of travel of the work stock and forwardly, toward saw blade 3, from the forward edge of said upwardly projecting leg. From the forward edge of the upwardly projecting leg, the strip of spring metal, hereinafter referred to as spring clip 35, is bent to extend inwardly toward the pathway of work stock on its way to the saw blade. The bottom edge of spring clip 35 is planarly consistent, for the most part, with the upper surface of bar member 5 and the extent to which it (the spring clip) is bent is such that it curves from the forward edge of the upwardly projecting leg of plate 25 inwardly to resilient contact with the saw-oriented edge of work stock advancing toward the saw blade when the apparatus is operating to thereby urge the stock toward fence 23 and help maintain it in its proper path of travel throughout the stripping operation.

As will by now be clear, the apparatus of this invention functions by feeding a strip or bar of work stock to saw blade 3 in such fashion that the rotating blade cuts a thin facing strip therefrom. The remaining body of the stock is conveyed past the blade and into a melting pot for melting and recasting into additional work stock or to other disposition. The means by which the work stock is conveyed to and past saw blade 3 in the described glide pathway along the top of bar member 5 comprises, in essence, a rubber drive roller 45, with a groove in the center of its rim to receive a belt of round cross-sectional area, said drive roller being supported and aligned to rotate in frictional contact with the upper surface of the work stock and in proper direction to move the stock in the right direction of movement; a second rubber roller 47 with grooved rim of similar size and shape as roller 45 and rotatably supported in frictional contact with the work stock and in alignment with its path of travel; a drive belt (preferably of stretchable neoprene) of round cross-sectional configuration 49 fitted into the grooves in the rims of and operatively connecting rollers 45 and 47; a gear head electric motor drivingly connected to drive roller 45 to supply the necessary power to the apparatus; two idler rollers 53 and 55 rotatably supported in such position as to place them in bearing contact with the undersurface of work stock being processed (hereinafter referred to in the drawing descriptions as work stock 57) and located directly beneath, and in alignment with, rollers 45 and 47, respectively. Idler rollers 53 and 55 are preferably steel roller bearings, or otherwise made of a suitable metal rather than rubber as in the case of rollers 45 and 47. The reason for this is that they serve an important function in elevating the work stock slightly above the level of the glide surface on bar member 5 over which said stock is moving. To this end, the idler rollers are mounted in such position that their points of bearing contact with the work stock project from about .005 to about .010 inch above said glide surface. The method of mounting and hardware used, as well as other pertinent details regarding rollers 53 and 55, their housing arrangements, etc., will be disclosed hereinafter.

Idler rollers 53 and 55 are caused to move by virtue of their bearing contact with the moving work stock 57 which is in turn propelled by the frictional contact of drive roller 45, drive belt 49 and belt driven roller 47 aided by pressure means forcing the rollers and belt downwardly against the upper surface of the work stock. The pressure means, in addition to insuring sufficient frictional contact to move said work stock forward, helps to keep it well seated in its channel of travel as it moves through the machine. The pressure means consist of: (1) a spiral compression spring 59, vertically mounted on top of a side extension 61 of a gear box 65, from which extension a drive shaft 63 furnishing the driving force to drive roller 45 extends, drive shaft 63 being the final link in a power chain connecting the drive unit of a gear head motor 51 and roller 45 through gear box 65; (2) a curved, finger-like, metallic compression member 71 fixedly secured at one end to a mounting bracket on motor 51 by machine screw means, as shown on FIGURES 3, 5 and 6, and bearing downwardly, as a result of transmitting part of the weight of the motor thereto, at its other end on a stationary shaft 73 around which roller 47 rotates; and (3) pressure from the weight of motor 51 acting on roller 45 through drive shaft 63.

Spiral spring 59 is held in place at its lower end by an oilcup 67 in extension 61 of gear box 65 around which it is disposed, and at its upper end by compression bearing relationship against a Plexiglas shield forming the cover of a Plexiglas housing partially surrounding saw blade 3 and the drive mechanism for the apparatus of this invention. Because of the compact manner of assembly of the apparatus and the rather unusual way in which gear head motor 51 is supported, it is necessary to provide a receptive opening for part of the bottom portion of gear box 65 in bar member 5 to permit it to depend freely therein out of supportive contact with anything other than that with roller 45 through drive shaft 63. The necessity for this arrangement resides in the fact that the primary purpose of throwing the weight of the gear head onto roller 45, rather than elsewhere, is not to provide means of support for the gear head but to furnish pressure to the roller for reasons set forth above. FIGURE 4 illustrates the problem and solution by showing gear box 65 partly within an opening of the indicated type.

Drive roller 45 and roller 47 are held in proper spaced relationship and maintained as an integral unit by means of a tie bar 75. Tie bar 75 parallels the plane of travel of belt 49 and serves essentially as a spacer between the axes of rotation of the two rollers but also as a means of affixing and keeping proper longitudinal alignment of roller 47 with drive roller 45. The way in which tie bar 75 accomplishes these dual functions is made clear by FIGURE 3 which shows the tie bar to have on its left end (adjacent drive roller 45) a sleeve-like socket, disposed at right angles to its shank, which encircles drive shaft 63 in bearing contact relationship thereto, said socket having an axial length almost equal to the distance between gear box extension 61 and drive roller 45 but sufficiently short of that distance to permit nonbinding rotation of the roller, and on its right end an opening through which stationary shaft 73 partially passes as explained in greater detail below.

As previously indicated, tie bar 75 is disposed in fixed parallel relationship to the plane of operation of belt 49. This feature, coupled with the perpendicular socket connection between the tie bar and drive shaft 63 feature described above (which prevents the roller 47 end of the tie bar from wandering "off course"), figures importantly in the proper functioning of tie bar 75.

The parallelity between tie bar 75 and belt 49 is achieved with the aid of a shoulder stop around shaft 73 beyond which the size of the hole in the end of the former receptive of the latter will not permit it (the tie bar) to pass. The appropriate end of tie bar 75 is locked in place at the aforesaid shoulder stop on shaft 73 by lock nut means as shown in the drawings, particularly FIGURE 3. It will be apparent from the foregoing that shaft 73 is of rather unique construction in order to fulfill the various requirements, there specifically and inferentially set forth. While such a part can be made or obtained in any way within the scope of our invention, one manner of improvisation which we have found to be effective is to first obtain a machine bolt with a portion of its shank near the head unthreaded and of greater diameter than the threaded portion whereby there is an annular shoulder, or area of transition from larger to smaller bolt diameters, between the threaded and smooth sections of the shank, and then strip the threads from the bolt for a portion of its length near the nut engaging end thereof. It goes without saying, of course, that the selection of the starting bolt must be judiciously made so that it is properly characterized and dimensoned throughout to cooperate with the various other parts involved, be amendable to the described reshaping procedure, and otherwise fit the necessary requirements o fthe part. However, such selection is well within the normal capabilities of one skilled in the relevant art, particularly in view of present teachings, and it therefore presents no serious obstacle to the effective assembly of an apparatus in accordance with this invention.

FIGURES 1 and 3 effectively illustrate the function of shaft 73 and the reasons for its unique shape as described above. Thus, looking at those drawings, which show the use of a shaft fashioned from a machine bolt in the above-indicated manner, it will be seen that the shaft fits through a central aperture in roller 47 with the shank extending inwardly toward the motor-mounted side of the apparatus and the bolt head drawn up close, but not bindingly so, to the side of a hub in the roller nearest saw blade 3. As has previously been made clear, shaft 73 is held stationary and roller 47 rotates around it in service. Consequently, the relationship of shaft and roller is one requiring bearing contact therebetween. This type of connection is so well known as to require no detailed description here. Shaft 73, fully inserted through the hub aperture of roller 47, in the manner described, extends through the above denoted opening in the appropriate end of tie bar 75 to abutting contact at the shoulder (or transition area between longer and smaller diametered sections of the bolt where there is no clearly defined shoulder) around its shank separating the threaded and unthreaded portions thereof, between shaft and tie bar. The presence of the shoulder, its position on the shaft and its function (to maintain parallelity between tie bar and drive belt) have been discussed in detail above.

To lock tie bar 75 against the shoulder, or equivalent structural obstruction, on shaft 73, a lock nut 72 is drawn tight against the tie bar on the threaded portion of said shaft. From a point beyond the position of the lock nut fully tightened against tie bar 75 to the small end of the bolt (or shaft 73, as it is more properly called), there are no threads on the shaft. The reason for the lack of threads is to permit better contact between compression member 71 and the shaft. It will be remembered, in this connection, that compression member 71 brings part of the weight of motor 51 to bear on the conveying apparatus of this invention and thus aids in the efficient functioning thereof. While the bottom portion of motor 51, to which one end of compression member 71 is affixed, is lower in elevation than shaft 73, the relative positions of shaft and motor, length of compression member 71 (it is a thin strap-like member) and curving configuration of member 71 are all such as to permit the latter to extend up and over shaft 73 and catch it on its upper side to exert downwardly directed compressive force thereon. The way in which the involved parts interact to yield the desired result is clearly illustrated by the drawings. While it is preferred to have that part of shaft 73 coming into contact with compression member 71 free of threads, or other surface irregularities, it is not essential that such be the case and connected bolts, or the like, with all threads on their smaller (non-threaded) ends intact can be employed for the present purpose if otherwise suitable therefor.

Gear head motor 51 is supported at three points, one being the point of bearing contact between drive roller 45 and work piece 57 previously discussed. The manner in which the weight of motor 51 and its accessory gear box is supported by roller 45 is particularly well illustrated in FIGURE 4. The other two points of support are (1) the point of contact between compression member 71 and shaft 73, previously discussed, and (2) a pivotal connection between a pin or bolt 79, threadedly embedded in the back edge (away from the saw blade) of bar member 5 in the position shown on the drawings, and a hinge-like metal strap or support member 81 wtih a socket in one end of suitable size to receive pin 79 and screw holes in the other end of sufficient size and location to permit fastening of the member to a support bracket attached to the underside of motor 51 in the position shown particularly well in FIGURES 3 and 5. Support member 81 is made from a sufficiently tough metal and so sized and configured as to provide the connecting link between support pin 79 and motor 51 and maintain the latter in its proper position relative to the other functional parts of the apparatus. While gear head motor 51 does, in the strict sense, actually receive support at all thre points noted above, only one of the three, pin 79, is intended solely for that purpose, the other two furnishing the support as ancillary to other functions which they are primarily designed to perform. For example, the principal purpose of compression member 71 is to exert pressure on shaft 73, for reasons previously given, although in doing this it, in turn, receives some support for the weight of the motor from said shaft.

The remaning parts of the pictured apparatus are best described, it is believed, in the context of a more complete explanation of the manner in which it performs its intended function. As previously indicated, the first step in operating the described apparatus is (after, of course, starting the unit by means of a switch, or equivalent starting mechanism, which can simultaneously control not only the actuation of motor 51 but also the driving motor for saw blade 3) the feeding of an elongated strip or bar of work stock, such as a type metal slug, into the channel formed by the edge of fence 23, the upward extension of plate 25 above the level of bar member 5 and that portion of the upper surface of bar member 5 situated between the described side members (as well as the upper edge of the previously identified shim), to a length sufficient to permit the front end of the work stock to contact roller 45 in frictional engagement and thereafter automatically urge said work stock forward through the machine. Since roller 45 is under pressure from spring 59 and the weight of motor 51 it will be resting in contact with idler roller 53 situated directly thereunder until work stock 57 is forced in between the rollers at which point the work stock will be caught in a squeeze between guide roller 45 and idler roller 53 and moved ahead by the former. When this occurs idler roller 53 rotates and aids, to some extent, in the forward propulsion of the work stock.

Although not previously pointed out, it is of course necessary to provide receptive hollows in the forward (near the saw blade) portion of bar member 5 directly under drive roller 45 and belt driven roller 47 for the housing of idler rollers 53 and 55, respectively. These hollows are preferably made by drilling transverse holes concentric to the predetermined pattern of rotation of their correspondingly housed idler rollers in the appropriate side of bar member 5. The holes are made of slightly larger diameter than the rollers to be housed therein, to permit free rotation of said rollers, and are so located relative to rollers 45 and 47 disposed thereabove as to permit tangential contact between the respective upper and lower rollers in the assembled apparatus at rest and minus a charge of work stock. To make this possible, and also permit idler rollers 53 and 55 to project above the surface of bar member 5 in the manner, and for a distance as above specified, the aforesaid holes have a slot-like top openings, parallel to their axial centers, of sufficient width to serve these purposes.

Idler roller 53 rotates on a pin 85 threadedly embedded in the innermost wall of its cylindrical housing chamber in bar member 5, as shown in FIGURE 4. Pin 85 is made from a suitably sized machine bolt by stripping the threads from a sufficient portion of its upper length (near the head) to provide an axle shaft for roller 53 while, at the same time, leaving enough threads on the end of the shank opposite the head to permit its fastening in a receptive tap hole properly located in said innermost wall. A shim washer encircles pin 85 between said wall and idler roller 53 to insure proper lateral positioning of the roller relative to roller 45. The depth of the tap hole for pin 85 and the various other dimensional specifications involved in the preparation of the mounting hardware for roller 53 are preferably so correlated as to effectuate proper lateral positioning of roller 53 when pin 85 is tightened within its tap hole, with the aforesaid shim washer in place as indicated, until its head resides just inside the lateral opening of the housing chamber for the roller. This preferred mounting arrangement presupposes the use of proper shim washer, roller hub and bolt head (on pin 85) thicknesses, or axial dimensions, to provide close but not binding tolerances between the roller and its flanking members whereby said roller is free to rotate but can not wander too far laterally while in service. A mounting arrangement of the type described is shown in FIGURE 4. Many other arrangements are, of course, possible within the scope of our invention. The manner in which idler roller 55 is rotatably supported under roller 47 is similar to the described support setup for roller 53.

Plexiglas housing 69 which, as previously explained, partially encloses saw blade 3 and the drive mechanism of this invention, is constructed by gluing, or otherwise fastening, properly sized and shaped Plexiglas members together to yield a structure such as shown in the drawings and anchoring said structure to metal base members forming a part of our apparatus with several strategically placed machine screws. In the embodiment of our apparatus pictured in the drawings there are four such machine screws, two vertically disposed ones 89 and 91 passing transversely through the overlapping edge of a horizontally disposed member supported on a thick wall member, then downwardly within the body of said thick wall member to contact with bar member 5, the underlying base member, and into receptive tap holes therefor in said bar member. The other two screws, shown at 93 and 95, pass horizontally into the saw oriented edge of bar member 5 in the vicinity of idler wheel 55 and, in addition to anchoring housing 69 thereto, as shown, said screws serve to fasten a blade 97 for deflecting sawn facing strip away from the saw blade, to bar member 5. Blade 97, and its means of attachment to the apparatus will be discussed in greater detail below.

Plexiglas was chosen as the structural material for housing 69 because of its toughness and resistance to wear and also its transparency, the latter quality being useful in permitting a full view of the working parts of the apparatus at all times. It is not essential that the housing be made of Plexiglas, however, or even that there be a housing at all. For this reason, plus the fact that the drawings show the housing in sufficient detail to teach its apearance and manner of construction without the necessity of auxiliary descriptive material, no further discussion of said housing, except where necessary or desirable in discussing or describing other parts of the apparatus, will be here attempted.

Returning to the explanation of the operation of the pictured apparatus, after the body of work stock (hereinafter referred to as slug, although the use of that term is not intended to import use limitation of the apparatus to type metal slugs) has been caught between drive roller 45 and idler roller 53, it moves ahead under the frictional urging of the former plus that of moving belt 49 which, as previously pointed out, drivingly connects rollers 45 and 47. Shortly after the slug starts its movement under the influence of drive roller 45 and belt 49 it is brought into contact with rapidly rotating saw blade 3. To this point in its travel the slug has been confined to a fixed pathway, by physical restraining means heretofore described, so defined as to feed it to the saw blade at the proper geometrical approach to assure a face cut of the desired thickness. The manner and means of achieving the aforesaid proper geometrical approach have been previously taught herein and need not be elaborated on here.

After its initial contact with the saw blade, the slug continues to traverse its glide pathway under the urging of our frictional drive mechanism. This results in the continuous severance of a relatively thin face or border strip 99 from the slug by the saw. The border strip, upon removal or severance from the slug is routed away from its original direction of travel by a blade 97, previously mentioned, so configured and positioned as to bear at one end against the flat outer face of saw blade 3, said blade being longitudinally in line with and interceptive of the path of travel of said strip and presenting a surface inclining outwardly away from the saw in the direction of travel of said border strip whereby the strip, upon contact therewith, is guided away from the saw blade and onto an elongated receiving tray 103 disposed longitudinally parallel and adjacent said blade and inclined laterally downwardly from its edge nearest the blade.

Tray 103 is hung from two rod sections, or pins, threadedly, or otherwise, embedded in the side of bar member 5 nearest saw blade 3, said pins projecting horizontally outwardly from said bar member at the same elevation level in spaced apart relationship and having upturned outer ends. Two properly sized and spaced holes in the appropriate edge of the tray permit it to be hooked onto the aforesaid pins and thereby suspended in the desired position. The terms "hung" and "suspended" are here used rather loosely since tray 103 is not entirely supported by the two pins but receives some support from the edge of table top 2 upon which it catches and rests in its tendency to hang downwardly from the pin suspension points mentioned. There is an upright barrier along the lower edge of the tray to prevent material from falling off of that edge. Tray 103 is not an essential element of our aparatus but merely an optional feature which may be employed as an adjunct thereto if desired.

Blade 97 is an elongated, relatively thin metallic member so bent and configured as to contact saw blade 3 at one end and incline away therefrom in the above-described manner when properly installed on the pictured embodiment of our invention. The blade is so installed by means of two machine screws 93 and 95, previously mentioned in the discussion of Plexiglas housing 69, which pass through properly sized and located apertures in a flat portion thereof and into receptive taped holes in the front (saw-oriented) side of bar member 5 to anchor it thereto. As noted above, machine screws 93 and 95 help to fasten housing 69, as well as blade 97, to the subject apparatus, and to this end the flat portion of the blade is sandwiched between bar member 5 and the lower end of a partition-like Plexiglas member constituting a brace for said housing through which said screws pass and in which their heads are countersunk as shown in FIGURE 3. As FIGURE 3 also shows, the flat portion of blade 97 is not disposed flush against bar member 5, but spaced outwardly therefrom a short distance by means of spacing washers between blade and bar member on screws 93 and 95. The primary purpose of the washers is to maintain blade 97 sufficiently outwardly displaced from bar member 5 to permit its inclined portion to fit over saw blade 3 without undue stress on the blade or other involved part of the apparatus.

The flat portion of blade 97 has a longitudinal slot for most of its length near its upper edge in installed position. The result of the slot is to divide said flat portion into two separate functional segments, a thin finger-like segment, near the top, and the remaining portion through which machine screws 93 and 95 pass in their connective function. The thin finger-like segment is bent to extend inwardly, in the direction of body 101 of slug 57, and so positioned and sized as to either bear against, or approach to almost, but not quite touching contact with the outside edge of said body whereby it (the body) is either urged toward, or prevented from migrating away from, fence 23. The tap holes for machine screws 93 and 95 in bar member 5 are situated either side of the shaped hollow therein for roller 55. While the above description of blade 97 and its manner of attachment to bar member 5 is not exhaustive, it is adequate to convey an understanding of those features when considered in the light of the attached drawings.

After a slug has been split into border strip and remaining body portions as taught above, the border strip is routed onto tray 103, as indicated, from whence it is removed for ultimate use in newspaper advertising composition work or otherwise. The body portion travels through the pictured apparatus and past the right hand (as viewed) edge of table top 2 until the slug is completely defaced by saw blade 3, after which it (the body portion) is consigned to a so-called "hell pot" for melting and eventual reuse or alternatively disposed of.

An embodiment of our apparatus similar in all respects to that depicted by the drawings and described above was constructed and used with great success by us, and others, in the composing room of a daily newspaper for a period of several weeks well within the one year period immediately preceding the filing date of this application. In actual point of chronology, the construction of this working embodiment of our apparatus preceded the preparation of the drawings and the latter were, in fact, copied from the former. The subject working embodiment represented one of our earliest efforts in the construction of a device in accordance with this invention and it is not as sophisticated as the products of later efforts in the same direction. However, the resulting advance in sophistication comprehends only surface refinements and not evolutionary changes going to the essence of the invention and therefore does not adversely affect the value of the working embodiment as an excellent example of an apparatus incorporative of the critical hardware necessary to successful practice of our invention. In any event, the above-noted use of the working embodiment of the invention resulted in essentially flawless operation thereof in the stripping of numerous border faces from type metal slugs of both 6 and 12 pt. body thicknesses.

The preferred size dimensions and other controllable definitive characteristics of the various parts of the subject embodiment (as well as all other embodiments) of our invention are readily determinable by those skilled in the relevant art in the light of present teachings. However, for what it is worth in simplifying the determination of such dimensions, etc., the gear head motor of said embodiment was a 29 r.p.m. electric gear head motor of 1/60 H.P. Further, the table top saw in conjunction with which the work stock feeding mechanism of present consideration was employed was a slug stripper with its head removed, having a saw blade of 7-inch diameter driven by a 1/4 H.P. electric motor.

The work stock feeding mechanism of our invention can, of course, be constructed to any feasible scale and consequently it can be designed to effectuate the cutting of elongated work stock (which can be any metal or alloy amenable to sawing treatment, wood, or any other suitable material) bodies of any size into longitudinally divided segments of precisely dimensioned proportions so long as the ability of the mechanism to perform its function remains intact. When the mechanism is employed in its capacity of greatest contemplated use, that is, in its slug stripping capacity to produce border strips for newspaper advertising make-up, it is, in its preferred form, capable of handling feed slugs of from about 5-inch lengths on up (there being no maximum length limitation) having thicknesses within the range from about 2 to about 24 pts. (as those familiar with ad composition are aware, the normal working range of slug thicknesses is from about 6 to about 24 pts. but there is no theoretical reason for so limiting the capability of the preferred form of our invention).

The transverse depth of cut into the slug determines the height of the border strip produced by the involved sawing operation. There is no technical reason why our apparatus could not be used to produce border strips of almost any height, within certain obvious limitations, but, as previously explained, hot metal paste-up, the system which gave rise to the need this invention satisfies, requires a border strip height (or thickness, as such dimension is sometimes referred to) of either .065 or .152 inch, depending upon the particular hot metal paste-up technique employed. Consequently, our apparatus in its preferred form is designed to handle cuts consistent in range of transverse depth with the foregoing border strip thickness limitations. Ways of designing the necessary versatility for conversion from one of the aforesaid cut depths to the other (laterally oblong holes through fence 23 for the admission of screws 19 and 21, to permit lateral adjustment of said fence, and the use of an appropriate shim of .087 inch thickness) into the apparatus of our invention have been previously discussed.

It will be apparent that there are many possible variations of the apparatus of this invention which differ in noncritical particulars from the specific embodiment shown in the attached drawings and described above. All such variations, of course, fall within the spirit and scope of the invention so long as they are encompassed by the claims following hereinafter. As an example of the kind of noncritical structural deviation here contemplated, the apparatus could have a drive mechanism including only one downwardly pressing friction roller, rather than two as shown in the drawings at 45 and 47, if desired. We know such an embodiment to be operable since we have actually built and successfully used a drive mechanism so constructed. Other structures alternative to that pictured in the drawings which are within the compass of our invention include those with drive mechanisms utilizing flat, or other shaped, drive belts, rather than round ones such as belt 49; a drive mechanism similar to that of the drawings but with the front roller (corresponding to roller 47) rather than the rear one (corresponding to roller 45) directly driven by the gear head motor, this "pulling" type of drive might in some cases, actually be superior to the kind illustrated and described; and numerous other structural variants including those resulting from the desirability of streamlining or simplifying the process of manufacturing or fabricating the apparatus. Exemplary of the latter type of structural difference would be an apparatus similar to that of the drawings but having a single molded piece substituted for bar member 5 and the shim separating it from L-shaped plate 25.

The various parts of our apparatus can be made of whatever structural materials are taught or suggested to those skilled in the art from the above techings. For example, bar member 5 can be made of any suitable metal such as steel, cast aluminum, or the like, cast aluminum being preferred for reasons not necessary to go into here.

The aforesaid examples of the numerous ways in which our apparatus can vary in structure within the bounds of the invention are offered by way of illustration only and not by way of limitation. Accordingly, no limitative import should be attached to the examples and it is emphasized that any embodiment which maintains a structural and functional character consistent with the integrity of the invention as taught herein, and which falls within the breadth of the appended claims, is to be considered part and parcel of the invention.

What we claim is:

1. An apparatus for effecting the continuous removal of thin facing strips from bodies of work stock by sawing means, comprising:

(a) automatically vertically adjustable moving frictional contact means for automatically urging work stock, at a substantially constant rate of progress, along a fixed path of travel so situated relative to an operating rotary saw blade as to route said work stock thereby in facing strip severing contact therewith, said moving frictional contact means comprising:

(1) a plurality of rotatably mounted pulley means with interconnecting belt drive means stationed above, in substantially axially perpendicular relationship to the direction of and substantially axially parallel relationship to the plane of the bed of said fixed path of travel, said pulley means and said belt drive means being so individually sized, constructed and assembled, and the resulting assembly being so postioned and supported as to insure contact between substantially half of the nonpulley contacting length of said belt drive means and the upper surface of a body of said work stock disposed along said fixed path of travel for a distance at least equal to the spread distance of said rotatably mounted pulley means thereabove, said contact being of such frictional character as to induce movement of the body of work stock along the path of travel during operation of said apparatus, and all involved parts being so constructed that those belt surfaces, as well as any parts of the rims of said pulley means, contactable with said work stock during said operation are of frictional contact, but non-workstock scarring, character;

(2) said rotatably mounted pulley means comprising cooperating drive pulley means and follower pulley means;

(3) rotatably mounted roller means with rolling contact rim means disposed adjacently below the lower surface of a body of said work stock disposed along said fixed path of travel for a distance at least equal to the spread distance of the rotatably mounted pulley means of said moving frictional contact means thereabove, said roller means being fixedly positioned in substantially axially perpendicular relationship to the direction of and substantially axially parallel relationship to the plane of the bed of said path of travel and in vertical axial alignment with said rotatably mounted pulley means;

(4) motor means for driving said drive pulley means during operation of said apparatus;

(5) force exerting means urging said moving frictional contact means into sufficiently firm frictional contact with the upper surface of work stock disposed thereunder along said fixed path of travel to cause lineal movement of the latter upon rotational actuation of the drive pulley means of the former, said force exerting means being of such kind and disposition as to exert downward pressure on said rotatably mounted pulley means; and (6) means mechanically linking said motor means to the drive pulley means of said rotatably mounted pulley means whereby rotational actuation of the latter and concomitant lineal movement of said work stock disposed thereunder are made possible;

(b) cooperating means for simultaneously supporting said work stock during its traversal of said fixed path of travel during operation of said apparatus, comprising a member with a sliding contact upper surface of contact with said work stock over which the latter slides in mechanical response to the urging of said moving frictional contact means, said member having openings directly under the rotatably mounted pulley means of said moving frictional contact means to permit contact of said rotatably mounted roller means with rolling contact rim means with the lower surface of said work stock during its traversal of said fixed path of travel;

(c) cooperating means for simultaneously maintaining said work stock within the lateral confines of said fixed path of travel comprising fence means fixedly securable to said member with a sliding contact upper surface of contact with said work stock, said fence means being so positionally secured in the assembled apparatus to provide a guide for one lateral edge of said work stock during its traversal of said fixed path, thereby defining one lateral edge of said path, and means for exerting resilient pressure against the opposite lateral edge of said work stock whereby it is urged to sliding, abutting contact with said fence during its traversal of said fixed path, the resilient pressure being brought to bear on said work stock at a point along said fixed path of travel upstream of said saw blade, said fence means defining the lateral edge of said fixed path farthest removed from said operating saw blade;

(d) whereby said saw blade continuously cuts facing strip from said work stock during operation of said apparatus; and (e) means for laterally deflecting said facing strip away from said fixed path of travel to prevent its whipback to damaging contact with the teeth of said saw blade, said means being so stationed as to deflect said facing strip at a point upstream of its point of lateral passage of the noncutting peripheral edge of said rotary saw blade.

2. The apparatus of claim 1 in which the drive pulley means of said rotatably mounted pulley means is so positioned as to transmit pressure exerted by said force exerting means thereon downwardly on work stock being urged along said fixed path of travel, during operation of said apparatus, near the point at which the moving work stock meets the cutting edge of said rotary saw blade.

3. The apparatus of claim 1 in which the drive pulley means of said rotatably mounted pulley means is so positioned as to transmit pressure exerted by said force exerting means thereon downwardly on work stock being urged along said fixed path of travel, during operation of said apparatus, at a point slightly upstream of the point of contact of said work stock with the cutting edge of said rotary saw blade.

4. The apparatus of claim 1 in which the means for exerting the resilient pressure against a lateral edge of said work stock, as it is urged along said fixed path of travel during operation of said apparatus, is a strip of spring metal having a straight section and a curved section, said strip being positionally secured with its straight section transversely, vertically disposed and in work stock parallel orientation, and its curved section bearing inwardly toward said work stock, from the forward end of its straight section and in the direction of travel of the work stock to resilient contact with the saw-oriented edge thereof, the resulting area of contact between the work stock and strip of spring metal occurring, in terms of reference to the path along which the former moves, in the lateral vicinity of a point of downward pressure transmission on the work stock by said rotatably mounted pulley means.

5. The apparatus of claim 1 in which:
  (a) the drive pulley means of said rotatably mounted pulley means is so positioned as to transmit pressure exerted by said force exerting means thereon downwardly upon work stock being urged along said fixed path of travel, during operation of said apparatus, at a point slightly ahead of the point of contact of said work stock with the cutting edge of said rotary saw blade; and
  (b) the follower pulley means of said rotatably mounted pulley means is positioned downstream of the point at which said work stock passes the rear peripheral edge of said saw blade during said operation.

6. The apparatus of claim 1 in which the force exerting means of subparagraph (5) of subparagraph (a) comprises spring means and cooperating means for so tensioning same as to cause spring energy force flow in the proper direction to create said downward pressure on said rotatably mounted pulley means.

References Cited by the Examiner

UNITED STATES PATENTS

| | | | |
|---|---|---|---|
| 21,345 | 8/1858 | Leavitt | 143—159 |
| 2,314,605 | 3/1943 | Arnold | 143—55 X |
| 2,332,888 | 10/1943 | Bostwick et al. | 143—55 |
| 2,525,894 | 10/1950 | Graham | 144—242 X |
| 2,646,088 | 7/1953 | Smith | 143—55 |
| 3,120,777 | 2/1964 | Genin | 83—420 X |

FOREIGN PATENTS

| | | |
|---|---|---|
| 917,502 | 9/1954 | Germany. |
| 826,103 | 12/1959 | Great Britain. |

ANDREW R. JUHASZ, *Primary Examiner.*

J. B. McGUIRE, *Assistant Examiner.*